US010431244B2

(12) United States Patent
Blaber et al.

(10) Patent No.: US 10,431,244 B2
(45) Date of Patent: Oct. 1, 2019

(54) DEVICES INCLUDING A NEAR FIELD TRANSDUCER (NFT) INCLUDING PEG AND DISC FROM DIFFERENT MATERIALS

(71) Applicant: SEAGATE TECHNOLOGY LLC, Cupertino, CA (US)

(72) Inventors: Martin Blaber, Plymouth, MN (US); Tong Zhao, Eden Prairie, MN (US); Michael C. Kautzky, Eagan, MN (US); Justin Brons, Savage, MN (US); John C. Duda, Bloomington, MN (US); Yuhang Cheng, Edina, MN (US); Michael A. Seigler, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/864,480

(22) Filed: Jan. 8, 2018

(65) Prior Publication Data
US 2018/0144765 A1   May 24, 2018

Related U.S. Application Data

(63) Continuation of application No. 15/166,765, filed on May 27, 2016, now Pat. No. 9,865,283.
(Continued)

(51) Int. Cl.
*G11B 5/09* (2006.01)
*G11B 5/31* (2006.01)
*G11B 5/00* (2006.01)

(52) U.S. Cl.
CPC ............ *G11B 5/314* (2013.01); *G11B 5/3116* (2013.01); *G11B 5/3133* (2013.01); *G11B 2005/0021* (2013.01)

(58) Field of Classification Search
None
See application file for complete search history.

(56) References Cited

U.S. PATENT DOCUMENTS

| 6,144,098 A | 11/2000 | Iyer |
| 7,773,330 B2 | 8/2010 | Itagi |

(Continued)

FOREIGN PATENT DOCUMENTS

| CN | 103514888 | 1/2014 |
| CN | 104485119 | 4/2015 |

(Continued)

OTHER PUBLICATIONS

Satoh et al., "Evaluation of Adhesion Materials for Gold Line-and-Space Surface Plasmon Antenna on SO1-MOS Photodiode", Silicon Nanoelectronics Workshop (SNW), 2010, *IEEE*, Piscataway, NJ, USA, Jun. 13, 2010, pp. 1-2.
(Continued)

*Primary Examiner* — Peter Vincent Agustin
(74) *Attorney, Agent, or Firm* — Mueting, Raasch & Gebhardt, P.A.

(57) ABSTRACT

Devices that have an air bearing surface (ABS), the device includes a near field transducer (NFT) that includes a disc configured to convert photons incident thereon into plasmons; and a peg configured to couple plasmons coupled from the disc into an adjacent magnetic storage medium, wherein the disc includes a disc material that includes gold or an alloy thereof and the peg includes a peg material, wherein the disc material is different from the peg material and wherein the peg material has a real part of the permittivity that is not greater than that of gold.

9 Claims, 6 Drawing Sheets

Related U.S. Application Data

(60) Provisional application No. 62/300,796, filed on Feb. 27, 2016, provisional application No. 62/221,909, filed on Sep. 22, 2015, provisional application No. 62/167,318, filed on May 28, 2015, provisional application No. 62/167,321, filed on May 28, 2015.

(56) References Cited

U.S. PATENT DOCUMENTS

| | | | |
|---|---|---|---|
| 8,040,761 B2 | 10/2011 | Kawamori | |
| 8,077,556 B2 | 12/2011 | Komura | |
| 8,149,657 B2 | 4/2012 | Huang | |
| 8,248,897 B2 | 8/2012 | Shimazawa | |
| 8,286,329 B1 | 10/2012 | Zhao | |
| 8,339,740 B2 | 12/2012 | Zou | |
| 8,343,364 B1 | 1/2013 | Gao | |
| 8,351,151 B2 | 1/2013 | Katine | |
| 8,385,158 B1 | 2/2013 | Hu | |
| 8,400,902 B2 | 3/2013 | Huang | |
| 8,427,925 B2 | 4/2013 | Zhao | |
| 8,514,673 B1 | 8/2013 | Zhao | |
| 8,599,656 B2 | 12/2013 | Jin | |
| 8,634,280 B1 | 1/2014 | Wang | |
| 8,773,956 B1 | 7/2014 | Wang | |
| 8,787,129 B1 | 7/2014 | Jin | |
| 8,790,527 B1 | 7/2014 | Luo | |
| 8,830,800 B1 | 9/2014 | Pitcher | |
| 8,842,391 B2 | 9/2014 | Zou | |
| 8,934,198 B2 | 1/2015 | Zou | |
| 8,958,271 B1* | 2/2015 | Peng | G11B 5/314 369/13.13 |
| 8,971,160 B1 | 3/2015 | Yuan | |
| 8,976,634 B2 | 3/2015 | Cheng | |
| 9,058,824 B2 | 6/2015 | Cheng | |
| 9,263,074 B2 | 2/2016 | Huang | |
| 9,281,003 B2 | 3/2016 | Zhao | |
| 9,286,931 B2 | 3/2016 | Jayashankar | |
| 9,865,283 B2* | 1/2018 | Blaber | G11B 5/3133 |
| 2010/0104768 A1 | 4/2010 | Xiao | |
| 2010/0123965 A1* | 5/2010 | Lee | G11B 5/314 360/59 |
| 2010/0214685 A1 | 8/2010 | Seigler | |
| 2010/0321814 A1 | 12/2010 | Zou | |
| 2010/0329085 A1 | 12/2010 | Kawamori | |
| 2011/0002199 A1 | 1/2011 | Takayama | |
| 2011/0096431 A1 | 4/2011 | Hellwig | |
| 2011/0205863 A1 | 8/2011 | Zhao | |
| 2011/0209165 A1* | 8/2011 | Tsai | G11B 7/2433 720/718 |
| 2012/0105996 A1 | 5/2012 | Katine | |
| 2013/0107679 A1* | 5/2013 | Huang | G11B 13/08 369/13.32 |
| 2013/0148485 A1* | 6/2013 | Jin | G11B 5/314 369/13.17 |
| 2013/0170332 A1 | 7/2013 | Gao | |
| 2013/0235707 A1 | 9/2013 | Zhao | |
| 2013/0279314 A1 | 10/2013 | Peng | |
| 2013/0279315 A1* | 10/2013 | Zhao | G11B 13/04 369/13.33 |
| 2013/0288077 A1 | 10/2013 | Dhawam | |
| 2013/0330573 A1 | 12/2013 | Zhao | |
| 2014/0004384 A1 | 1/2014 | Zhao | |
| 2014/0251948 A1 | 9/2014 | Zhao | |
| 2014/0254335 A1* | 9/2014 | Gage | G11B 5/6088 369/13.33 |
| 2014/0307534 A1* | 10/2014 | Zhou | G11B 13/08 369/13.33 |
| 2014/0313872 A1 | 10/2014 | Rawat | |
| 2014/0374376 A1 | 12/2014 | Jayashankar | |
| 2014/0376342 A1 | 12/2014 | Wessel | |
| 2014/0376349 A1* | 12/2014 | Cheng | G11B 5/6088 369/13.33 |
| 2015/0043319 A1* | 2/2015 | Kasuya | H01L 27/15 369/13.33 |
| 2015/0063086 A1 | 3/2015 | Wierman | |
| 2015/0083601 A1 | 3/2015 | Lee | |
| 2015/0117170 A1 | 4/2015 | Zhao | |
| 2015/0131417 A1 | 5/2015 | Zhao | |
| 2015/0131418 A1 | 5/2015 | Huang | |
| 2015/0179194 A1* | 6/2015 | Cheng | G11B 5/3106 369/13.33 |
| 2015/0340052 A1 | 11/2015 | Sankar | |
| 2015/0380020 A1 | 12/2015 | Cheng | |
| 2016/0133291 A1* | 5/2016 | Chen | G11B 5/314 369/13.33 |
| 2016/0260448 A1 | 9/2016 | Zhao | |
| 2016/0284365 A1 | 9/2016 | Brons | |
| 2016/0351210 A1* | 12/2016 | Blaber | G11B 5/3133 |

FOREIGN PATENT DOCUMENTS

| | | |
|---|---|---|
| EP | 0580368 | 1/1994 |
| JP | 2011-008899 | 1/2011 |
| JP | 2013-122811 | 6/2013 |
| WO | WO 2013/163195 | 10/2013 |
| WO | WO 2013/163470 | 10/2013 |

OTHER PUBLICATIONS

Vogt, K.W. et al., "Characterization of Thin Titanium Oxide Adhesion Layers on Gold Resistivity, Morphology, and Composition", *Surface Science*, North-Holland, Amsterdam, NL, vol. 301, No. 1-3, Jan. 10, 1994, pp. 203-213.

Metallization: "Metallization"; chapter 5", In: Kris v. Srikrishnan and Geraldine C. Schwartz: "Handbook of Semiconductor Interconnection Technology, Second Edition", 2006, CRC Press, Boca Raton, FL, USA, XP002711255, ISBN:978-1-4200-1765-6, pp. 311-382, Section 5.4.1.2 Adhesion; p. 320.

PCT International Search Report and Written Opinion for PCT/US2016/034628 dated Aug. 24, 2016 914 pages).

PCT International Search Report and Written Opinion for PCT/US2016/034620 dated Aug. 18, 2016 (13 pages).

\* cited by examiner

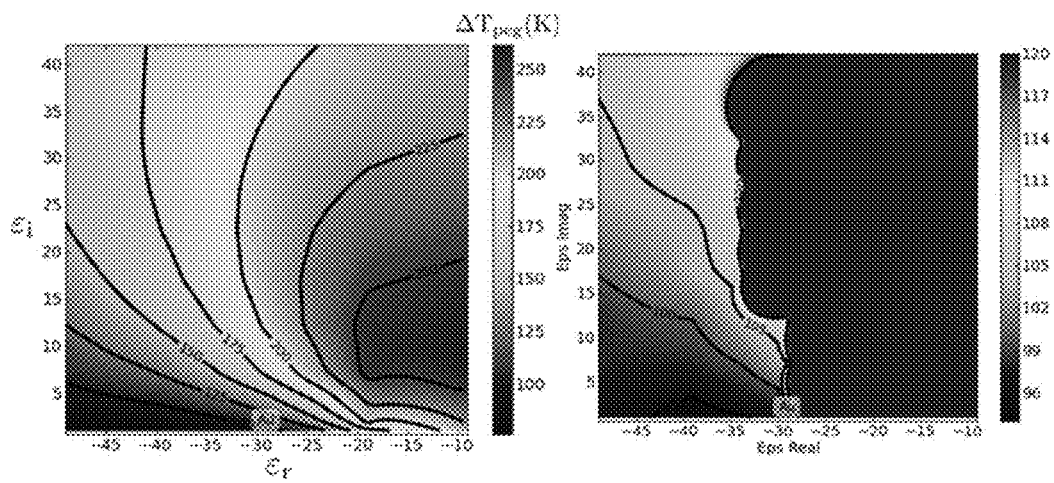
FIG. 17A  FIG. 17B
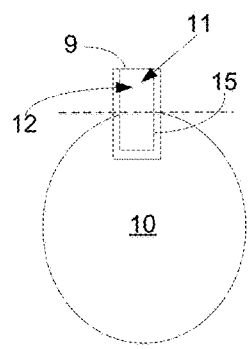 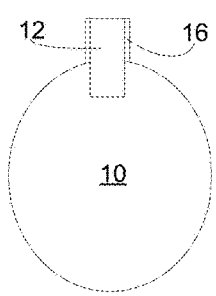 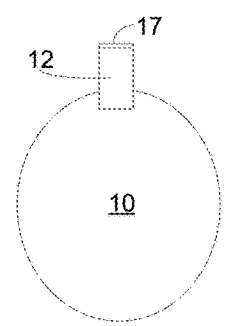
FIG. 18A  FIG. 18B  FIG. 18C
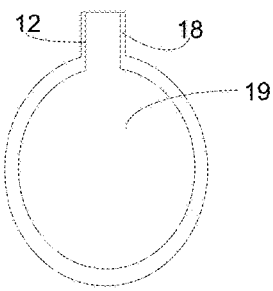
FIG. 18D
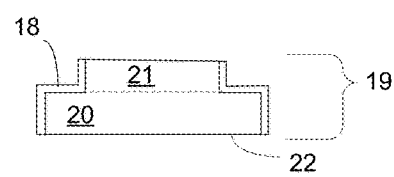
FIG. 18E

DEVICES INCLUDING A NEAR FIELD TRANSDUCER (NFT) INCLUDING PEG AND DISC FROM DIFFERENT MATERIALS

PRIORITY

This application claims priority to U.S. Provisional Applications No. 62/167,321 entitled NEAR FIELD TRANSDUCERS (NFTS) AND ASSOCIATED STRUCTURES filed on May 28, 2015; No. 62/167,318 entitled NEAR FIELD TRANSDUCER (NFT) INCLUDING AT LEAST ONE ADHESION LAYER filed on May 28, 2015; No. 62/221,909 entitled NEAR FIELD TRANSDUCER (NFT) DEVICES INCLUDING RHODIUM (Rh) filed on Sep. 22, 2015; and No. 62/300,796 entitled DEVICES INCLUDING NEAR FIELD TRANSDUCER (NFT) filed Feb. 27, 2016, the disclosures of which are incorporated herein by reference thereto.

SUMMARY

Disclosed are devices that have an air bearing surface (ABS), the device includes a near field transducer (NFT) that includes a disc configured to convert photons incident thereon into plasmons; and a peg configured to couple plasmons coupled from the disc into an adjacent magnetic storage medium, wherein the disc includes a disc material that includes gold or an alloy thereof and the peg includes a peg material, wherein the disc material is different from the peg material and wherein the peg material has a real part of the permittivity that is not greater than that of gold.

Also disclosed are devices that have an air bearing surface (ABS), the device including a near field transducer (NFT) including a disc configured to convert photons incident thereon into plasmons; and a peg configured to couple plasmons coupled from the disc into an adjacent magnetic storage medium, wherein the disc includes gold or a gold alloy and the peg includes a peg material that is different from the disc material and wherein the peg material is selected from: aluminum (Al), antimony (Sb), bismuth (Bi), chromium (Cr), cobalt (Co), copper (Cu), erbium (Er), gadolinium (Gd), gallium (Ga), hafnium (Hf), indium (In), iridium (Ir), iron (Fe), manganese (Mn), molybdenum (Mo), nickel (Ni), niobium (Nb), osmium (Os), palladium (Pd), platinum (Pt), rhenium (Re), rhodium (Rh), ruthenium (Ru), scandium (Sc), silicon (Si), silver (Ag), tantalum (Ta), tin (Sn), titanium (Ti), vanadium (V), tungsten (W), ytterbium (Yb), yttrium (Y), zirconium (Zr), or combinations thereof.

Also disclosed are devices having an air bearing surface (ABS), the device including a near field transducer (NFT) that includes a disc configured to convert photons incident thereon into plasmons; a peg configured to couple plasmons coupled from the disc into an adjacent magnetic storage medium, the peg having a front surface at the air bearing surface of the device, an opposing back surface, a top surface that extends from the front surface to the back surface, two side surfaces that extend from the front surface to the back surface and a bottom surface that extends from the front surface to the back surface; an adhesion layer located on at least one surface of the peg, wherein the disc includes gold or a gold alloy and the peg includes a peg material that is different from the disc material and wherein the peg material is selected from: aluminum (Al), antimony (Sb), bismuth (Bi), chromium (Cr), cobalt (Co), copper (Cu), erbium (Er), gadolinium (Gd), gallium (Ga), hafnium (Hf), indium (In), iridium (Ir), iron (Fe), manganese (Mn), molybdenum (Mo), nickel (Ni), niobium (Nb), osmium (Os), palladium (Pd), platinum (Pt), rhenium (Re), rhodium (Rh), ruthenium (Ru), scandium (Sc), silicon (Si), silver (Ag), tantalum (Ta), tin (Sn), titanium (Ti), vanadium (V), tungsten (W), ytterbium (Yb), yttrium (Y), zirconium (Zr), or combinations thereof.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

FIGS. 17A and 17B are graphs showing the effective of the real and imaginary parts of the permittivity of the peg material on the peg temperature (FIG. 17A) and the cross track erasure (FIG. 17B).

FIGS. 18A-18E show diagrams including optional adhesion layers in possible illustrative configurations.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to data storage devices that utilize heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic media during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the paramagnetic effect.

A laser or other energy source may be directly (e.g., surface-attached) or indirectly (e.g., via optical fiber) coupled to a HAMR read/write head. An optical path (e.g., waveguide) is integrated into the read/write head and delivers the light to a media-facing surface of the read/write head. Because the size of the desired hotspot (e.g., 50 nm or less) is smaller than half a wavelength of the laser light (e.g., 800-1550 nm), conventional optical focusers (e.g., lenses) are diffraction limited and cannot be used to focus the light to create the hotspot. Instead, a near-field transducer (NFT) is employed to direct energy out of the read/write head. The NFT may also be referred to as a plasmonic transducer, plasmonic antenna, near-field antenna, nano-disc, nano-patch, nano-rod, etc.

Generally, the NFT is formed by depositing a thin-film of material such as gold, silver, copper, etc., near an integrated optics waveguide or some other delivery system. When exposed to laser light that is delivered via the waveguide, the light generates a surface plasmon field on the NFT. The NFT is shaped such that the surface plasmons are directed out of a surface of the write head onto a magnetic recording medium.

Due to the intensity of the laser light and the small size of the NFT, the NFT and surrounding material are subject to a significant rise in temperature during writing. Over time, this can affect the integrity and/or reliability of the NFT, for example, causing it to become misshapen or recess. Other events, such as contact between the read/write head and recording medium, contamination, etc., may also degrade the operation of the NFT and nearby optical components. Degradation of the NFT will affect the effective service life of a HAMR read/write head. In view of this, methods and apparatuses described herein are used to increase the thermal robustness of the NFT, such as at a peg that extends towards the recording media.

Figure 1:
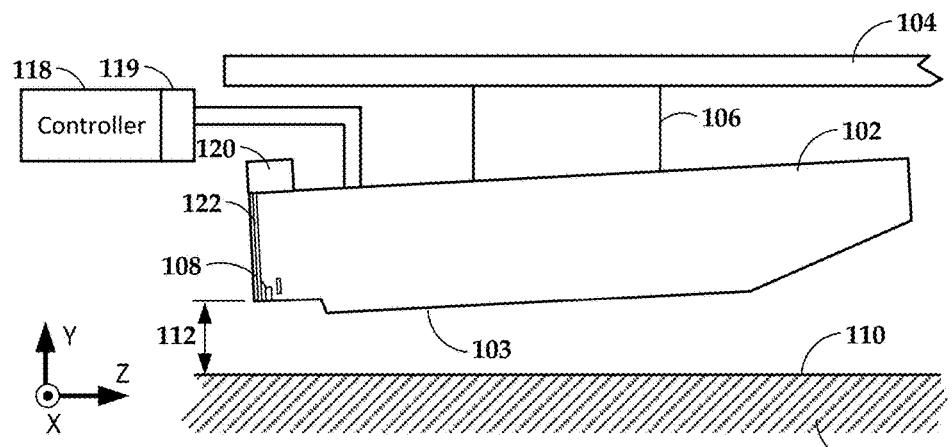
FIG. 1 is a block diagram of a hard drive slider and media arrangement according to an illustrative embodiment.

In reference now to FIG. 1, a block diagram shows a side view of a read/write head 102 according to an example embodiment. The read/write head 102 may be used in a magnetic data storage device, e.g., HAMR hard disc drive. The read/write head 102 may also be referred as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disc. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

A controller 118 is coupled to the read/write transducers 108, as well as other components of the read/write head 102, such as heaters, sensors, etc. The controller 118 may be part of general- or special-purpose logic circuitry that controls the functions of a storage device that includes at least the read/write head 102 and recording medium 111. The controller 118 may include or be coupled to interface circuitry 119 such as preamplifiers, buffers, filters, digital-to-analog converters, analog-to-digital converters, decoders, encoders, etc., that facilitate electrically coupling the logic of the controller 118 to the signals used by the read/write head 102 and other components.

The illustrated read/write head 102 is configured as a HAMR device, and so includes additional components that form a hot spot on the recording medium 111 near the read/write transducer 108. These components include laser 120 (or other energy source) and waveguide 122. The waveguide 122 delivers light from the laser 120 to components near the read/write transducers 108. These components are shown in greater detail in FIG. 2, which is a block diagram illustrating a cross-sectional view of the read/write head 102 according to an example embodiment.

Figure 2:
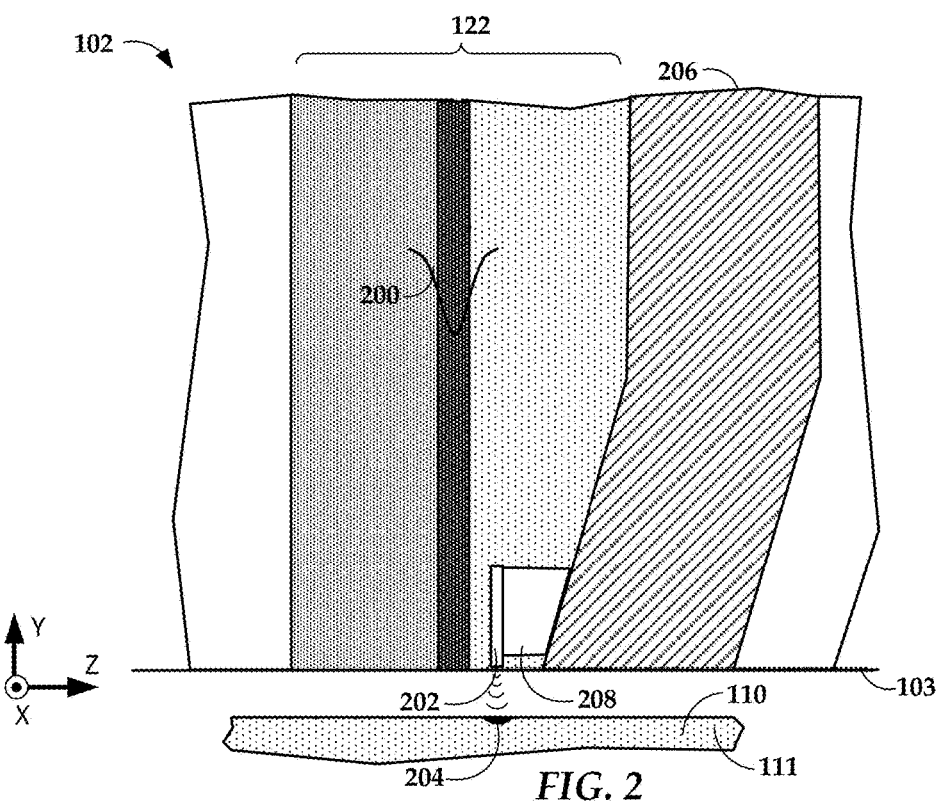
FIG. 2 is a cross-sectional view of a read/write head according to an illustrative embodiment.

As shown in FIG. 2, the waveguide 122 receives electromagnetic energy 200 from the energy source, the energy being coupled to a near-field transducer (NFT) 202. The NFT 202 is made of a metal (e.g., gold, silver, copper, etc.) that achieves surface plasmonic resonance in response to the applied energy 200. The NFT 202 shapes and transmits the energy to create a small hotspot 204 on the surface 110 of medium 111. A magnetic write pole 206 causes changes in magnetic flux near the media-facing surface 103 in response to an applied current. Flux from the write pole 206 changes a magnetic orientation of the hotspot 204 as it moves past the write pole 206 in the downtrack direction (z-direction).

The energy 200 applied to the near-field transducer 202 to create the hotspot 204 can cause a significant temperature rise in a local region near the media-facing surface 103. The near-field transducer 202 may include a heat sink 208 that draws away some heat, e.g., to the write pole 206 or other nearby heat-conductive component. Nonetheless, the temperature increase near the near-field transducer 202 can be significant, leading to degradation of the near-field transducer 202 and other components over time. As such, techniques described herein facilitate increasing thermal robustness of the near-field transducer.

Figure 3:
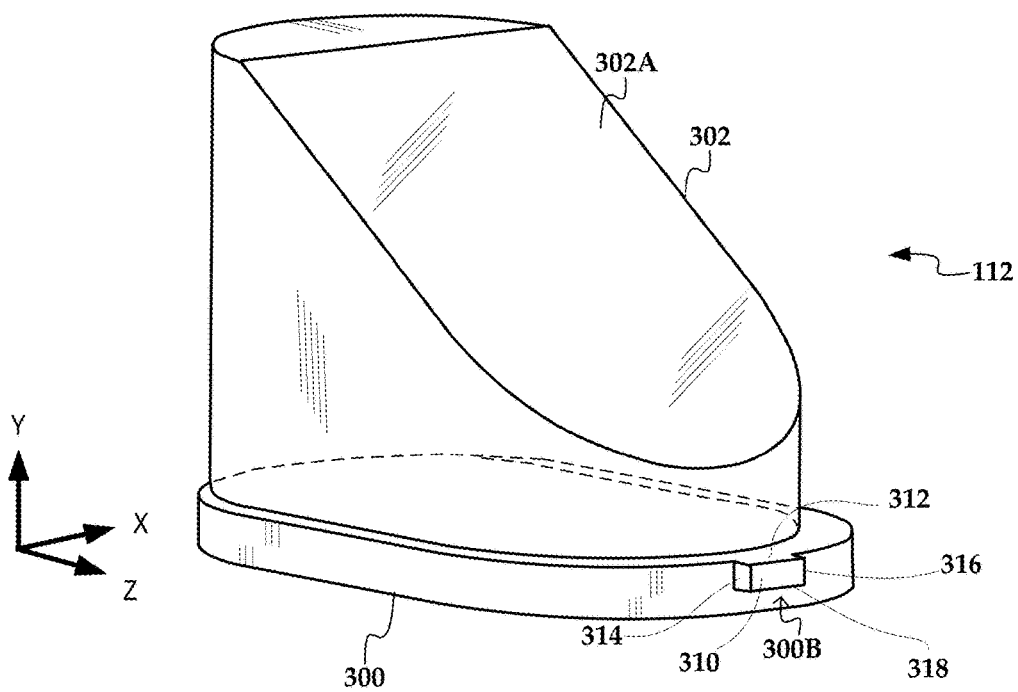
FIG. 3 is a perspective view of a near-field transducer according to an illustrative embodiment.

In FIG. 3, a perspective views show details of a device 112 including a NFT. The device 112 can include two parts: a disc 300 and a heat sink 302 proximate to (e.g., deposited directly on to) the disc 300. In this example, the outline of the disc 300 on the xz-plane (which is a substrate-parallel plane) is enlarged relative to the heat sink 302, although they may be the same size. The heat sink 302 can include an angled surface 302a that is located proximate to a write pole (see, e.g., write pole 206 in FIG. 2).

The disc 300 acts as a collector of optical energy from a waveguide and/or focusing element. The disc 300 achieves surface plasmon resonance in response to the optical energy and the surface plasmons are directed to the medium via a peg 300b that extends from the disc 300. It should be noted that the heat sink may also contribute to the energy transfer process and in some such embodiments a NFT does not necessarily include a separate disc and heat sink but a single component that can act as both. In this example, the disc 300 is configured as an elongated plate with rounded (e.g., circular) ends, also referred to as a stadium or capsule shape. Other enlarged portion geometries may be used, including circular, rectangular, triangular, etc.

Figure 4:
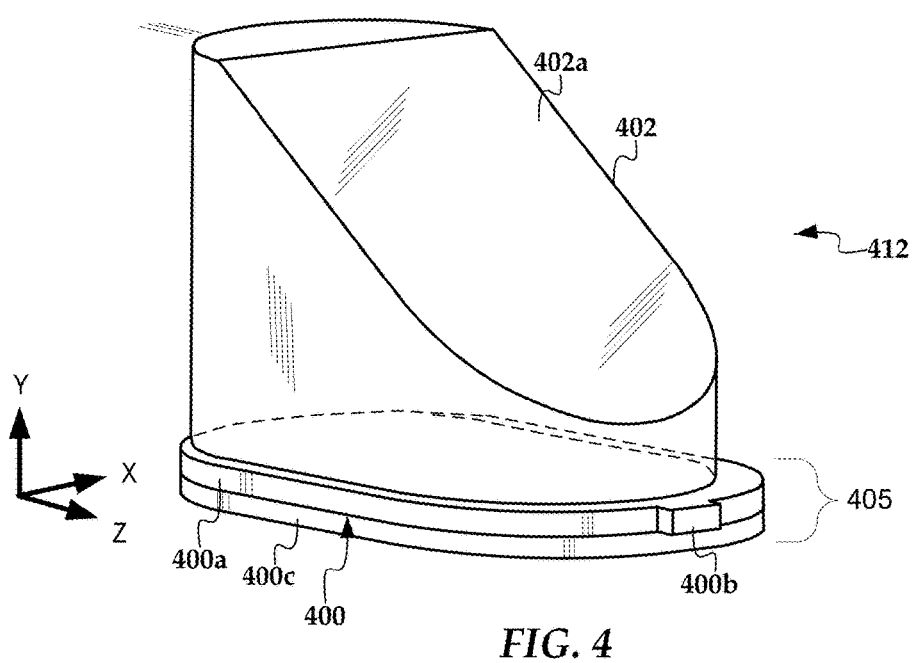
FIG. 4 is a perspective view of a near-field transducer according to an illustrative embodiment.

In FIG. 4, a perspective views show details of a device 412 according to an example embodiment. The device 412 includes a NFT 405 and a heat sink 402 proximate to (e.g., deposited directly on to) the disc 400 of the NFT 405. In this example, the outline of the disc 400 on the xz-plane (which is a substrate-parallel plane) is enlarged relative to the heat sink 402, although they may be the same size. The heat sink 402 includes an angled surface 402a that is located proximate to a write pole (see, e.g., write pole 206 in FIG. 2).

The disc 400 includes a top disc 400a that acts as a collector of optical energy from a waveguide and/or focusing element. The top disc 400a achieves surface plasmon resonance in response to the optical energy and the surface plasmons are directed to the medium via a peg 400b that extends from top portion 400a. In this example, the top portion 400a is configured as an elongated plate with rounded (e.g., circular) ends, also referred to as a stadium or capsule shape. Other enlarged portion geometries may be used, including circular, rectangular, triangular, etc.

The disc 400 also includes a bottom disc 400c. The bottom disc 400c can also be referred to as a sunken disc. The term "sunken disc" refers to a base or bottom portion that extends below the peg, as shown by the base portion 400c in FIG. 3. This can also be described as the peg extending beyond the bottom disc 400c. In some embodiments, such as that depicted in FIG. 4, the bottom disc 400c and the top disc 400a can have the same outline shape (e.g., stadium shape) as well as a same outline size. In some embodiments, the bottom disc 400c and the top disc 400a can have different outline shapes, different outline sizes, or combinations thereof. The peg 400b extends beyond the bottom disc 400c. The bottom portion 400c is disposed proximate a light delivery structure (e.g., a waveguide core) and away from a write pole. In some embodiments, the bottom disc 400c may likely be, but need not be, the primary collector of optical energy.

In FIGS. 5-16, composite views show NFT configurations according to additional embodiments. For purposes of convenience, the write pole and media-facing surface are assigned reference numbers 902 and 900, respectively in all of FIGS. 5-16. In each of FIGS. 5-16, view (a) is a plan view of a substrate-parallel plane of an NFT, heat sink, and write pole 902 near a media-facing surface 900, where the write pole 902 is at the bottom. In these figures, view (b) is a plan view of just the NFT, and view (c) is a side view of an NFT, heat sink, and write pole 902 near a media-facing surface 900. In each case, the size and shape, relative position and material of both the base portions and associated pegs are chosen such that the base portions convert incident photons into plasmons. It should be noted herein that "base portions" can be similar to "discs" as referred to elsewhere in this application. The plasmon is coupled from the base portions to the pegs, the pegs coupling energy into a magnetic storage medium.

In the embodiments of FIGS. 5-16, based portions, pegs, and heatsinks may be made of similar, identical or distinct materials. In particular embodiments, the pegs may be made of a thermally robust material described above and the base portions and heat sinks may be made of plasmonic materials. Also, in the embodiments shown in FIGS. 5-16 where the peg is embedded in a base portion, the base portions may include recesses that expose a top side of the peg, and the peg may have a thickness that is less than that of the base portion in which the peg is embedded. Any of the embodiments shown in FIGS. 5-16 may also be used with a waveguide (e.g., waveguide core) proximate the base portion(s), and may also include a plasmonic disc that is located on a side of the waveguide that faces away from the base portion(s).

Figure 5:
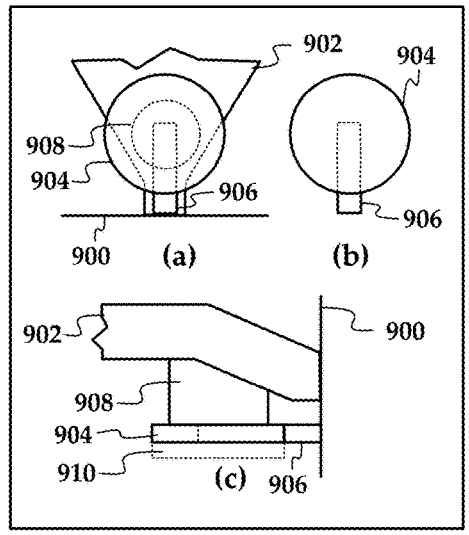
FIGS. 5-16 are each diagrams showing multiple views of near-field transducer arrangements according to additional illustrative embodiments.

In FIG. 5, an NFT includes a disc-style base portion 904 and a peg 906. The peg 906 is rod-shaped and extends to a middle of the base portion 904. The base portion 904 is has a circular contour/outline in this example, although a stadium or other topographically similar shapes may also be used. A heat sink 908 has a contour/outline that follows that of the base portion 904 (circular outline in this example, although could be stadium shaped when used with a stadium-shaped or other topographically similarly shaped base portion) and extends from a major surface of the base portion 904 to the write pole 902. The heat sink 908 has a smaller contour than the base portion 904 in this example, although the heat sink's contour may be the same size as that of the base portion 904 in some embodiments. A lower base portion 910 may optionally be used. The lower base portion 910 extends from a second major surface of the base portion 904 away from the heat sink 902. An outer surface of the lower base portion 910 may be proximate a light delivery structure, e.g., waveguide (not shown).

Figure 6:
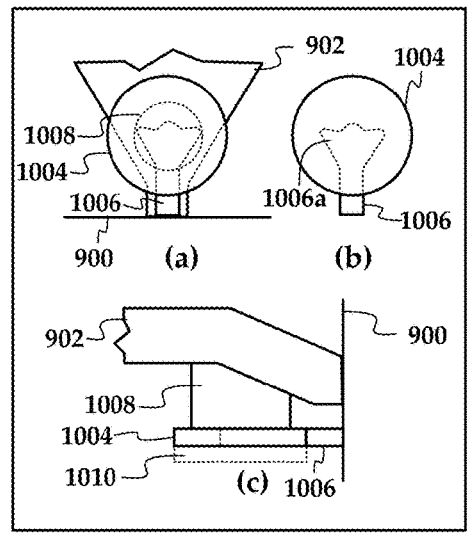

In FIG. 6, an NFT includes a circular disc-shaped base portion 1004 and a peg 1006. The peg 1006 has a flared end 1006a that extends to a middle of the base portion 1004. The flared end 1006a is a geometrical structure that improves adhesion and/or thermal transport and/or plasmonic coupling between the peg 1006 and base portion 1004. A stadium shape may instead be used for the outer contours of the base portion 1004. A heat sink 1008 has a contour that follows that of the base portion 1004 and extends from a major surface of the base portion 1004 to the write pole 902. The heat sink 1008 has a smaller contour than the base portion 1004 in this example, although its contour may be the same size as that of the base portion 1004 in some embodiments. A lower base portion 1010 may optionally be used similar to the lower base portion 910 in the description of FIG. 5.

Figure 7:
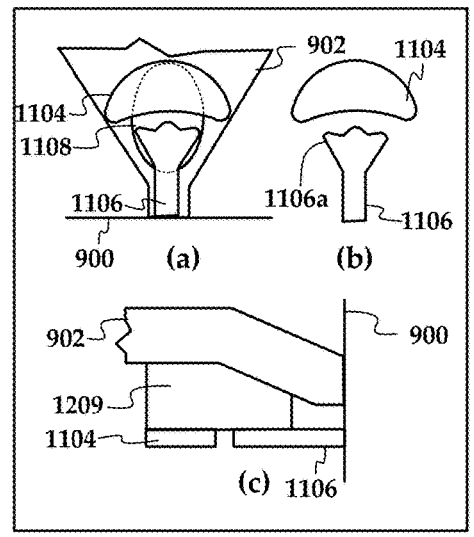

In FIG. 7, an NFT includes a crescent-shaped base portion 1104 and a peg 1106. The base portion 1104 has a crescent shape in this example, although other shapes may be used, e.g. a stadium, rectangle or other topographically similar shapes. The peg 1106 has a flared end 1106a that extends towards the base portion 1104, however the peg 1106 and base portion 1104 are not joined directly together. The flared end 1106a is a geometrical structure that improves plasmonic coupling between the peg 1106 and base portion 1104. A heat sink 1108 joins the base portion 1104, the peg 1106 the write pole 902. The heat sink 1108 has an oval shape in this example, although other shapes may be used, e.g., a shape that follows the contour of the base portion 1104 at one end.

Figure 8:
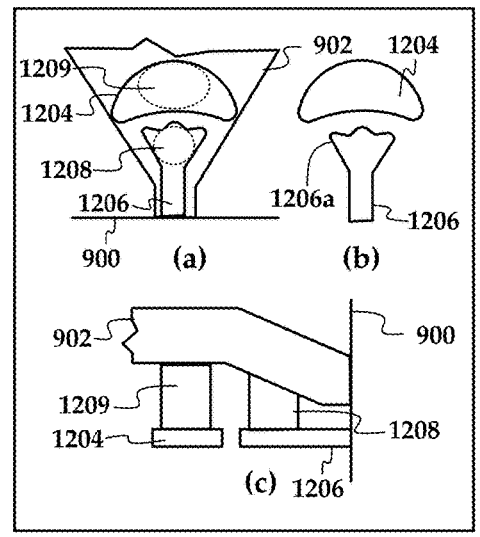

In FIG. 8, an NFT includes a crescent-shaped base portion 1204 and a peg 1206. The base portion 1204 has a crescent shape in this example, although other shapes may be used, e.g. a stadium, rectangle or other topographically similar shapes. The peg 1206 has a flared end 1206a that extends towards the base portion 1204. The peg 1206 and base portion 1204 are not joined directly together. The flared end 1206a is a geometrical structure that improves plasmonic coupling between the rod 1206 and base portion 1204. A first heat sink 1208 joins the peg 1206 to the write pole 902, and second heat sink 1209 joins the base portion 1204 to the write pole 902. The heat sinks 1208, 1209 have oval and round shapes in this example, although other shapes may be used. For the shape of heat sink 1209 may follow that of the base portion 1204.

Figure 9:
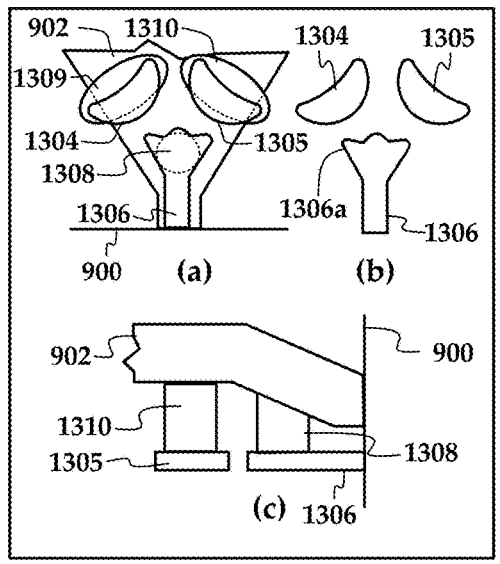

In FIG. 9, an NFT includes two crescent-shaped base portions 1304, 1305 separated by a gap. The base portions 1304, 1305 have a crescent shape in this example, although other shapes may be used, e.g. a stadium, rectangle or other topographically equivalent shapes, designed to enhance the coupling of light from the waveguide (not shown) to the surface plasmon. The peg 1306 has a flared end 1306a that extends towards the gap between the base portions 1304, 1305 however the peg 1306 and base portions 1304, 1305 are not joined directly together. The flared end 1306a is a geometrical structure that improves plasmonic coupling between the rod 1306 and base portions 1304, 1305. A first heat sink 1308 joins the peg 1306 to the write pole 902, and second heat sinks 1309, 1310 join the base portions 1304, 1305 to the write pole 902. The heat sinks 1308-1310 have oval and round shapes in this example, although other shapes may be used. For the shape of heat sinks 1309, 1310 may follow that of the respective base portions 1304, 1302.

Figure 10:
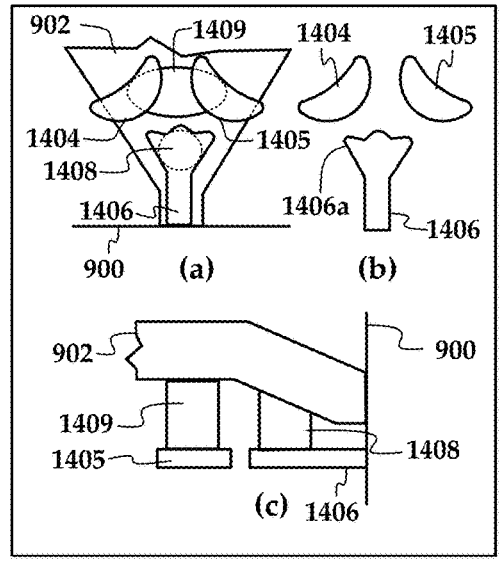

In FIG. 10, an NFT includes two crescent-shaped base portions 1404, 1405 separated by a gap. The base portions 1404, 1405 have a crescent shape in this example, although other shapes may be used, e.g. a stadium, rectangle or other topographically equivalent shapes, designed to enhance the coupling of light from the waveguide (not shown) to the surface plasmon. The peg 1406 has a flared end 1406a that extends towards the gap between the base portions 1404, 1405. The peg 1406 and base portions 1404, 1405 are not joined directly together. The flared end 1406*a* is a geometrical structure that improves plasmonic coupling between the rod 1406 and base portion 1404. A first heat sink 1408 joins the peg 1406 to the write pole 902, and second heat sink 1409 joins the base portions 1404, 1405 to the write pole 902. The heat sinks 1408, 1409 have oval and round shapes in this example, although other shapes may be used. For the shape of heat sink 1409 may follows that of the base portions 1404, 1405.

Figure 11:
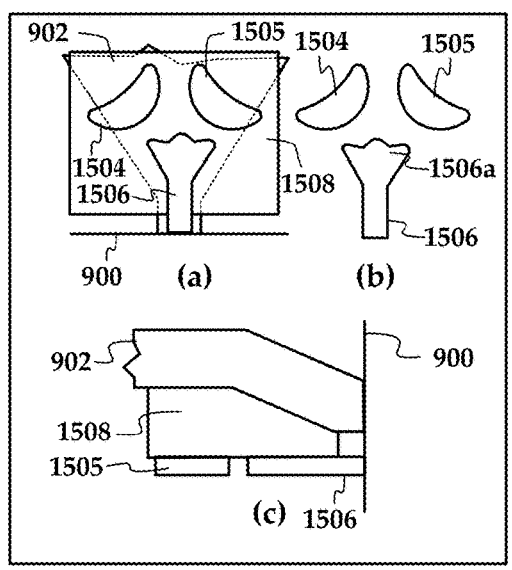

In FIG. 11, an NFT includes two crescent-shaped base portions 1504, 1505 separated by a gap. The base portions 1504, 1505 have a crescent shape in this example, although other shapes may be used, e.g. a stadium, rectangle or other topographically equivalent shapes, designed to enhance the coupling of light from the waveguide (not shown) to the surface plasmon. The peg 1506 has a flared end 1506*a* that extends towards the gap between the base portions 1504, 1505. The peg 1506 and base portions 1504, 1505 are not joined directly together. The flared end 1506*a* is a geometrical structure that improves plasmonic coupling between the rod 1506 and base portion 1504. A first heat sink 1508 joins the peg 1506 to the write pole 902, and second heat sink 1509 joins the base portions 1504, 1505 to the write pole 902. The heat sinks 1508, 1509 have oval and round shapes in this example, although other shapes may be used. For the shape of heat sink 1509 may follows that of the base portions 1504, 1505.

Figure 12:
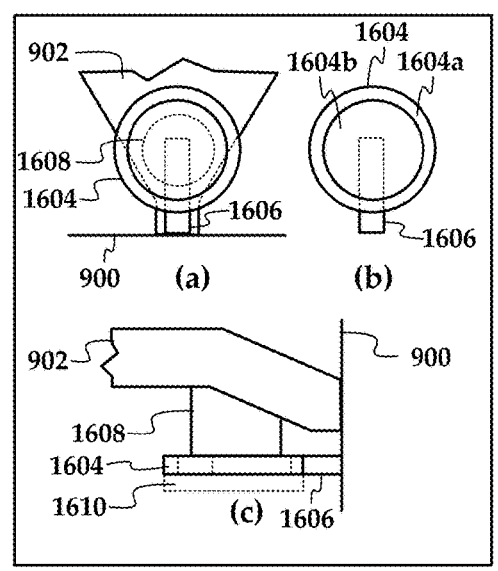

In FIG. 12, an NFT includes a circular disc-shaped base portion 1604 and a peg 1606. The peg 1606 is rod-shaped and extends to a middle of the base portion 904. The base portion 1604 is has two, concentric sections 1604*a-b* that are formed of different materials. The sections 1604*a-b* may be configured to improve any combination of plasmon coupling, heat sinking, adhesion, and diffusion prevention. For example, section 1604*a* may be formed from a thermally robust material that adheres well to the peg 1606, and section 1604*b* may be formed from a plasmonic material chosen for efficient plasmonic excitation and coupling. A stadium shape may instead be used for the outer contours of the base portion 1604, as well as the contours of the sections 1604*a-b*. A heat sink 1608 has a contour that follows that of the base portion 1604 and extends from a major surface of the inner section 1604*a* of the base portion 1604 to the write pole 902. The heat sink 1608 may be the same size as the outer contours of the base portion 1604 in some embodiments. A lower base portion 1610 may optionally be used similar to the lower base portion 910 in the description of FIG. 9. The lower base portion 1610 may cover one or both sections 1604*a-b* of the base portion 1610.

Figure 13:
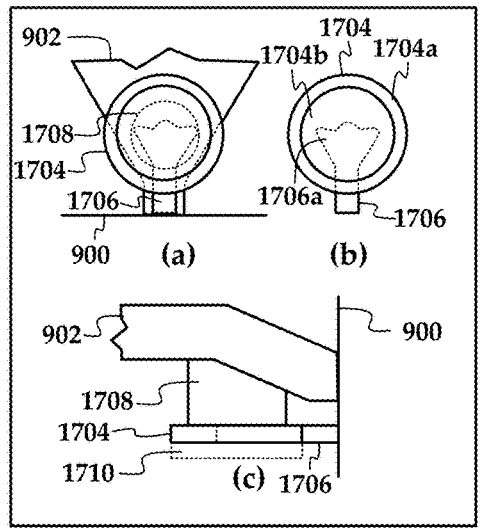

In FIG. 13, an NFT includes a circular disc-shaped base portion 1704 and a peg 1706. The peg 1706 has a flared end 1706*a* that extends into a center of the base portion 1704. The flared end 1706*a* is a geometrical structure that may improve adhesion and/or thermal transport and/or plasmonic coupling between the peg 1706 and base portion 1704. The base portion 1704 is has two, concentric sections 1704*a-b* that are formed of different materials, and may be configured to improve any combination of plasmon coupling, heat sinking, adhesion, and diffusion prevention. A stadium shape may instead be used for the outer contours of the base portion 1704, as well as the contours of the sections 1704*a-b*. A heat sink 1708 has a contour that follows that of the base portion 1704 and extends from a major surface of the inner section 1704*a* of the base portion 1704 to the write pole 902. The heat sink 1708 may be the same size as the outer contours of the base portion 1704 in some embodiments. A lower base portion 1710 may optionally be used similar to the lower base portion 910 in the description of FIG. 5. The lower base portion 1710 may cover one or both sections 1704*a-b* of the base portion 1710.

Figure 14:
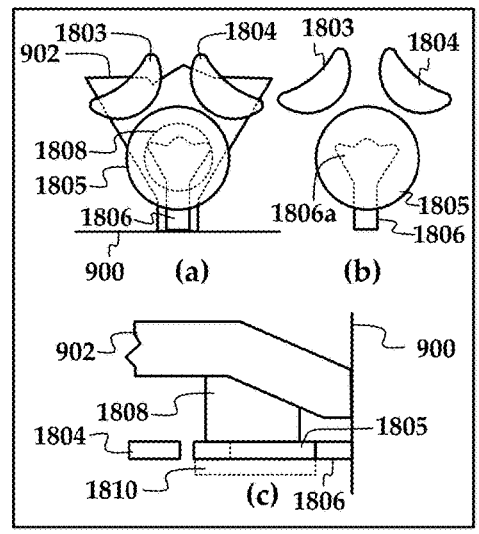

In FIG. 14, an NFT includes multiple base portions 1803-1805 and a peg 1806. The base portions include a disc 1805 (shown circular, but may be stadium-shaped) and two crescent shaped portions 1803, 1804 (shown crescent but may take other shapes) that are not directly connected to either the disc 1805 or the peg 1806. The peg 1806 has a flared end 1806*a* that extends into a center of the disc-shaped base portion 1805. A heat sink 1808 has a contour that follows that of the base portion 1805 and extends from a major surface of the base portion 1804 to the write pole 902. The heat sink 1808 may be the same size as the outer contours of the base portion 1804 in some embodiments. Optionally, one or both of the crescent shaped portions can be connected to the heat sink 1808. A lower base portion 1810 may optionally be used similar to the lower base portion 910 in the description of FIG. 5. The lower base portion 1810 may cover one or both sections 1804*a-b* of the base portion 1810.

Figure 15:
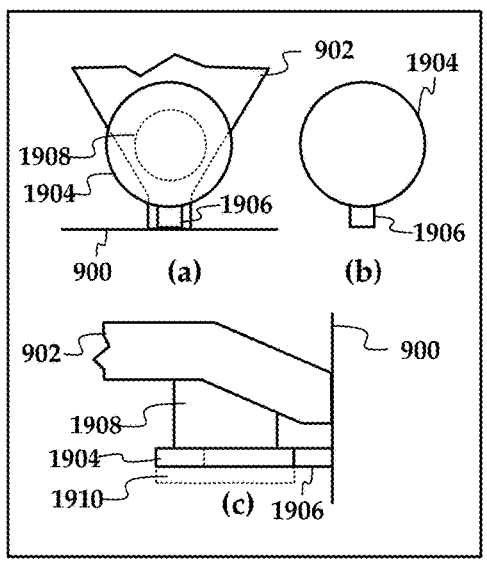

In FIG. 15, an NFT includes a disc-style base portion 1904 and a peg 1906. The peg 1906 is rod-shaped and abuts an edge of the base portion 1904. The base portion 1904 is has a circular contour in this example, although a stadium shape may also be used. A heat sink 1908 extends from a major surface of the base portion 1904 to the write pole 902 and may be configured as described in regards to FIG. 5. A lower base portion 1910 may optionally be used as described in regards to FIG. 5.

Figure 16:
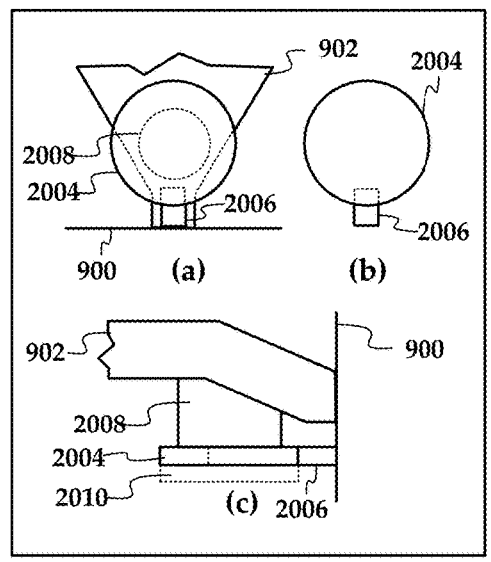

In FIG. 16, an NFT includes a disc-style base portion 2004 and a peg 2006. The peg 2006 is rod-shaped and extends partially into the base portion 2004, e.g., between the center of the base portion 2004 and an edge of the base portion 2004 that faces the recording media. The base portion 2004 has a circular contour in this example, although a stadium shape may also be used. A heat sink 2008 extends from a major surface of the base portion 2004 to the write pole 902 and may be configured as the description of FIG. 5. A lower base portion 2010 may optionally be used as in the description of FIG. 5. The overlap between the peg and the base portion as shown, e.g., in FIGS. 5, 14, and 16 may be chosen to optimize the efficiency, areal density capability and/or reliability of the device.

The embodiments of FIGS. 15 and 16 (as well as others) in particular may gain advantage by having the peg made of a thermally robust material and the disc made of a plasmonic material.

Any of the embodiments described above, or combinations of any of the embodiments above may use any combination of disclosed thermally robust material for the peg and disclosed plasmonic material for the other structures (e.g., NFT base portions or discs). Also, combinations of disclosed material may be used in individual components, e.g., layers of different thermally robust materials may form the peg, layers of plasmonic and thermally robust materials may form the peg and/or other (non-peg) parts of the NFT (e.g., the disc or one or more of a multi-layer disc), and layers of different plasmonic materials may be used to form the other (non-peg) parts of the NFT.

In some embodiments, the relationship between the optical properties of the peg material and disc material may be selected to ensure that the size of the optical spot is of a desired size. The optical properties of the peg and disc materials can be described by their "relative permittivity", $\varepsilon$.

Where ε is a material dependent, complex, optical frequency (ω) dependent quantity of the form $\varepsilon(\omega)=\varepsilon_r(\omega)+i\varepsilon_i(\omega)$ that is related to the material refractive index: $\varepsilon r(\omega)=n(\omega)2-k(\omega)2$, $\varepsilon i(\omega)=2*n(\omega)*k(\omega)$. The real part of the permittivity, $\varepsilon_r(\omega)$, describes the electric field distribution in the material, and the imaginary part, $\varepsilon_i(\omega)$, describes the amount of energy lost to heating. To excite a plasmon resonance on the disc at a particular incident laser wavelength, either (1) the size and shape of the disc can be chosen to support the resonance, and $\varepsilon_r(\omega)$ of the disc is less than zero; or (2) the $\varepsilon_r(\omega)$ of the material is chosen such that the given size and shape supports a resonance.

Configurations, including size and shape, relative position, materials or combinations thereof in disclosed embodiments can be chosen such that (1) the disc converts incident photons into plasmons; (2) the plasmons are coupled from the disc to the peg; (3) the peg couples energy into the magnetic storage medium. "Disc" as used herein does not imply any prescribed shape or configuration but instead a unit or portion of the NFT that converts energy from photons to plasmons. The disc may include one or more than one pieces. The disc may include more than one piece, more than one material, or both.

The disc may either be in direct contact with the peg where the interface is abutted, overlapping or stitched to the peg, is separated from the peg by some distance, or the more than one piece of the peg may be separated by some distance. The peg may be a rod like structure or it may contain geometrical structures that improve adhesion, plasmonic coupling, or both. The amount of overlap between the peg and the disc, if present may be chosen to advantageously affect efficiency, areal density capability, reliability, or any combination thereof. Excessive, undesirable heating may be prevented or minimized by heat sinking the disc, the peg, or both using one or more heat sink units. The one or more heat sink units may be made of the same or a different material than the peg, the disc or both.

In some embodiments, the imaginary part of the permittivity ($\varepsilon_i(\omega)$) of all materials (peg and disc for example) utilized are kept as small as possible in order to reduce the amount of heating in the device due to plasmon resonance. In some embodiments, the imaginary part of the permittivity could be higher if the thermal, mechanical, or both stabilities were increased to at least partially offset the increase in temperature. In some embodiments the imaginary part of the permittivity can be large so long as the absolute magnitude of the permittivity is large, so as to reduce the total internal field and minimize heating.

In some embodiments, materials of the peg and the disc can be chosen based at least in part, on the real part of the permittivity ($\varepsilon_r(\omega)$) of the materials. For the peg to be able to focus the field into the medium, the real part of the permittivity of the peg material must be approximately equal to, or less than the real part of the permittivity of the disc at the same wavelength. In some embodiments, this implies that the material of the peg has a higher effective carrier concentration than the disc. In some embodiments, the optical criteria for the relationship between the real part of the permittivity of the peg and the disc may be relaxed, for example if there were substantial benefits with respect to reliability. This may be applicable, for example in cases where a potential peg material has a relatively high melting point, a relatively high resistance to oxidation, or both.

The impact of the real and imaginary parts of the permittivity of the peg on the temperature of the peg, cross track erasure (which is related to the size of the optical spot on the magnetic media), or both can be evaluated. FIGS. 17A and 17B show the effect of the real ($\varepsilon_r(\omega)$) and imaginary ($\varepsilon_i(\omega)$) parts of the permittivity of the peg on the peg temperature (FIG. 17A); and cross track erasure (FIG. 17B) assuming a disc that is made of gold (Au). From FIG. 17A, it can be seen that in this configuration, if the peg is made of a material that has a lower effective carrier density than gold (a real permittivity greater than −30), then the temperature of the peg increases (see temperature gradient lines on graph) rapidly as it becomes more difficult to couple energy into the media and the track width becomes larger (FIG. 17B). If the peg is made of a material that has a higher effective carrier density than gold (a real permittivity less than −30) then the peg temperature is reduced (FIG. 17A) and it becomes easier to couple energy into the disc and the track width becomes narrower (FIG. 17B).

In some embodiments, materials for the peg, the disc, the heat sink, or any combinations thereof can include aluminum (Al), antimony (Sb), bismuth (Bi), chromium (Cr), cobalt (Co), copper (Cu), erbium (Er), gadolinium (Gd), gallium (Ga), gold (Au), hafnium (Hf), indium (In), iridium (Ir), iron (Fe), manganese (Mn), molybdenum (Mo), nickel (Ni), niobium (Nb), osmium (Os), palladium (Pd), platinum (Pt), rhenium (Re), rhodium (Rh), ruthenium (Ru), scandium (Sc), silicon (Si), silver (Ag), tantalum (Ta), tin (Sn), titanium (Ti), vanadium (V), tungsten (W), ytterbium (Yb), yttrium (Y), zirconium (Zr), or combinations thereof. Illustrative examples of materials for the peg, the disc, the heat sink, or any combinations thereof can include binary and/or ternary alloys including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the peg, the disc, the heat sink, or any combinations thereof can include lanthanides, actinides, or combinations thereof including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the peg, the disc, the heat sink, or any combinations thereof can include dispersions including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the peg, the disc, the heat sink, or any combinations thereof can include alloys or intermetallics based on or including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative alloys or intermetallics can include, for example binary and ternary silicides, nitrides, and carbides. For example vanadium silicide (VSi), niobium silicide (NbSi), tantalum silicide (TaSi), titanium silicide (TiSi), palladium silicide (PdSi) for example zirconium nitride (ZrN), aluminum nitride (AlN), tantalum nitride (TaN), hafnium nitride (HfN), titanium nitride (TiN), boron nitride (BN), niobium nitride (NbN), or combinations thereof. Illustrative carbides can include, for example silicon carbide (SiC), aluminum carbide (AlC), boron carbide (BC), zirconium carbide (ZrC), tungsten carbide (WC), titanium carbide (TiC) niobium carbide (NbC), or combinations thereof. Additionally doped oxides can also be utilized. Illustrative doped oxides can include aluminum oxide (AlO), silicon oxide (SiO), titanium oxide (TiO), tantalum oxide (TaO), yttrium oxide (YO), niobium oxide (NbO), cerium oxide (CeO), copper oxide (CuO), tin oxide (SnO), zirconium oxide (ZrO) or combinations thereof. Illustrative examples of materials for the peg, the disc, the heat sink, or any combinations thereof can include conducting oxides, conducting nitrides or combinations thereof of various stoichiometries where one part of the oxide, nitride or carbide includes Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the peg, the disc, the heat sink, or any combinations thereof can include a metal including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr doped with oxide, carbide or nitride nanoparticles. Illustrative oxide nanoparticles can include, for example, oxides of yttrium (Y), lanthanum (La), barium (Ba), strontium (Sr), erbium (Er), zirconium (Zr), hafnium (Hf), germanium (Ge), silicon (Si), calcium (Ca), aluminum (Al), magnesium (Mg), titanium (Ti), cerium (Ce), tantalum (Ta), tungsten (W), thorium (Th), or combinations thereof. Illustrative nitride nanoparticles can include, for example, nitrides of zirconium (Zr), titanium (Ti), tantalum (Ta), aluminum (Al), boron (B), niobium (Nb), silicon (Si), indium (In), iron (Fe), copper (Cu), tungsten (W), or combinations thereof. Illustrative carbide nanoparticles can include, for example carbides of silicon (Si), aluminum (Al), boron (B), zirconium (Zr), tungsten (W), titanium (Ti), niobium (Nb), or combinations thereof. In some embodiments nanoparticles can include combinations of oxides, nitrides, or carbides. It is to be understood that lists of combinations of elements are not exclusive to monoatomic binary combinations, for example VSi is taken to include $V_2Si$ and $VSi_2$, for example.

The real and imaginary permittivity of an element, alloy, or composition can be determined using methods such as spectroscopic ellipsometry or implied from spectroscopic reflectivity and transmissivity measurements of films of representative thickness. The real and imaginary permittivity of many common materials can be garnered from scientific reports or collations thereof, in some cases a conversion between the refractive index and the permittivity must be completed (the complex permittivity is the square of the complex refractive index $\varepsilon=(n+ik)^2$). For example the permittivity of Au at a wavelength of 830 nm can be determined from the refractive index data compiled in the "Handbook of Optical Constants of Solids" (Ed. Edward D. Palik, Academic Press 1985), the disclosure of which is incorporated herein by reference thereto, where the value given is at a wavelength of 826.6 nm and the complex refractive index is (0.188+5.39i). The complex permittivity is then $(0.188+5.39i)^2$ or (−29.0+2.0i).

TABLE 1

Refractive indices and permittivities from "Handbook of Optical Constants of Solids" (Ed. Edward D. Palik, Academic Press 1985)

| Material | Wavelength (nm) | Refractive Index | | Permittivity | | |
|---|---|---|---|---|---|---|
| | | n | k | Real | Imaginary | Absolute |
| Au | 826.6 | 0.188 | 5.39 | −29.0 | 2.0 | 29.1 |
| Ni | 826.6 | 2.53 | 4.47 | −13.6 | 22.6 | 26.4 |
| Al | 826.6 | 2.74 | 8.31 | −61.5 | 45.5 | 76.6 |
| Ag | 826.6 | 0.145 | 5.5 | −30.2 | 1.6 | 30.3 |
| Cu | 826.6 | 0.26 | 5.26 | −27.6 | 2.7 | 27.7 |
| Ir | 826.6 | 2.65 | 5.39 | −22.0 | 28.6 | 36.1 |
| Rh | 826.6 | 2.78 | 6.97 | −40.9 | 38.8 | 56.3 |
| Pt | 826.6 | 2.92 | 5.07 | −17.2 | 29.6 | 34.2 |
| Os | 826.5 | 2.84 | 1.8 | 4.8 | 10.2 | 11.3 |

In some embodiments, a disc can be made of one of the illustrative materials discussed above having a first real permittivity $(\varepsilon_r(\omega)^1)$ and a peg can be made of one of the illustrative materials discussed above that has a second real permittivity $((\varepsilon_r(\omega)^2)$ where the second real permittivity $((\varepsilon_r(\omega)^2)$ is not greater than (or is less than or equal to) the first real permittivity $(\varepsilon_r(\omega)^1)$. In some embodiments, a disc can be made of gold, having a real permittivity $(\varepsilon_r(\omega)^1)$ of −30, and a peg can be made of a material having a real permittivity $(\varepsilon_r(\omega)^2)$ that is not greater than (or is less than or equal to) −30 for example Ag, Rh, Al.

In some embodiments, a disc can be made of Au or alloys thereof and a peg can be made of Ag, Cu, ZrN, Ta, AlTi, Pd, Pt, Ni, Co, Ir, Rh, Al, alloys thereof, or combinations thereof. In some embodiments, a peg can be made of Rh, Al, Ir, Ag, Cu, Pd, Pt, alloys thereof, or combinations thereof. In some embodiments, a disc can be made of a gold alloy, which may be selected from AuBi, AuBiC, AuY, AuYO, AuHf, AuHfO, AuLaO, or AuZrO, for example. In some embodiments, a disc can be made of Au or alloys thereof and a peg can include Rh or Ir. In some embodiments, a disc can be made of Au or alloys thereof and a peg can include Rh. In some embodiments, a disc can be made of Au, Ag, Cu, or transition metal nitrides and a peg can include Rh or Ir. In some embodiments, a disc can be made of Au, Ag, Cu, or transition metal nitrides and a peg can include Rh. In some embodiments, a disc can be made of Au or alloys thereof and a peg can be made of an Au, Rh, Ir ternary alloy or a Rh, Ir, Pd ternary alloy.

In some embodiments where the disc includes a gold alloy, the non-gold element(s) of the alloy may be introduced into the Au disc via co-sputtering, layer-by-layer deposition, layer-by-layer deposition with oxygen, via ion implant, via nanoparticle inclusion, or any combination thereof. The presence of the alloyed substituent may serve to arrest grain growth, stabilize grain boundaries, stabilize interfaces, increase melting point, improve interface adhesion, or some combination thereof. In some embodiments, the resulting film is greater than 50 atomic percent gold. The permittivities of these materials range from $\varepsilon=(-15+5i)$ to $\varepsilon=(-40+3i)$ depending on the exact composition and materials. In some embodiments, gold-based materials or gold alloys where the non-gold component(s) make up, in total, less than 10 atomic percent of the disc can be utilized. In some embodiments, the disc can include AuBiC, AuY, AuYO, or AuZrO, for example, where the non-gold component comprises less than 5 atomic percent of the disc. Discs with this level of non-gold constituents may provide improved mechanical properties with the least impact on the permittivity compared to gold.

In some embodiments, materials that have a real permittivity less than −10 (at a wavelength of 830 nm) can be used as a peg material. In some embodiments, materials with either (exclusively either) low imaginary permittivity, or very large absolute real and very large absolute imaginary permittivity can be utilized for the peg material. In the case of low imaginary permittivity, imaginary permittivity may be traded for mechanical robustness. For example, silver has imaginary permittivity <1, indicating very low loss, but is not mechanically or thermally robust, nor resistant to corrosion, whereas ZrN and Ta are mechanically robust and have imaginary permittivity less than 15. Materials with large absolute real permittivity and large imaginary permittivity may also be advantageous as peg materials as they suffer less from heating. Illustrative examples can include Al, Rh, NiFe, AlTi and Ir. In some embodiments, materials that are hard, mechanically robust, resistant to oxidation, have high melting temperature, large absolute permittivity, or combinations thereof may be utilized. Illustrative examples can include Rh and Ir.

In some embodiments, a disc can be made of one of the illustrative materials discussed above having a first real permittivity $(\varepsilon_r(\omega)^1)$ and a peg can be made of one of the illustrative materials discussed above that has a second real permittivity $((\varepsilon_r(\omega)^2)$ where the second real permittivity $((\varepsilon_r(\omega)^2)$ is not greater than and within 50% of the first real permittivity $(\varepsilon_r(\omega)^1)$. In some embodiments the material of the peg also has a relatively high thermal stability and resistance to oxidation. In some embodiments, a disc can be made of gold, having a real permittivity $(\varepsilon_r(\omega)^1)$ of −30, and a peg can be made of a material having a real permittivity $(\varepsilon_r(\omega)^2)$ not greater than and within 50% of −30. In some embodiments the material of the peg also has a relatively high thermal stability and resistance to oxidation, for example Rh or Ir but not Ni In some embodiments, a disc can be made of one of the illustrative materials discussed above and a peg can be made of a material having a relatively high melting point. In some embodiments, a disc can be made of Au and a peg can be made of a material having a relatively high melting point. In some illustrative embodiments, materials with high melting points can include those having a melting point of not less than (or even greater than or equal to) 1000° C. In some illustrative embodiments, materials with high melting points can include those having a melting point of not less than (or even greater than or equal to) 1500° C. In some illustrative embodiments, materials with high melting points can include those having a melting point of not less than (or even greater than or equal to) 1800° C. Illustrative materials that are considered to have relatively high melting points can include, for example those in Table 2 below.

TABLE 2

| Element | Melting point (° C.) | Element | Melting point (° C.) |
|---------|----------------------|---------|----------------------|
| Be | 1278 | Pm | 1080 |
| B  | 2300 | Sm | 1072 |
| C  | 3550 | Gd | 1311 |
| Si | 1410 | Tb | 1360 |
| Sc | 1539 | Dy | 1409 |
| Ti | 1660 | Ho | 1470 |
| V  | 1890 | Er | 1522 |
| Cr | 1857 | Tm | 1545 |
| Mn | 1244 | Lu | 1659 |
| Fe | 1535 | Hf | 2227 |
| Co | 1495 | Ta | 2996 |
| Ni | 1453 | W  | 3410 |
| Y  | 1523 | Re | 3180 |
| Zr | 1852 | Os | 3045 |
| Nb | 2408 | Ir | 2410 |
| Mo | 2617 | Pt | 1772 |
| Tc | 2172 | Au | 1064 |
| Ru | 2310 | Th | 1750 |
| Rh | 1966 | Cm | 1340 |
| Pd | 1552 | Ac | 1050 |
| Nd | 1010 | Pa | 1600 |

In some embodiments, disclosed NFTs including a disc and a peg made of different materials can also include optional adhesion layers. In some embodiments, the optional adhesion layers can be adjacent one or more surfaces of the peg. Experimental evidence has shown, with respect to rhodium pegs in particular, that the rhodium often gets oxidized during processing and/or formation of the peg itself. An overlying adhesion layer would be advantageous both to maintain the peg in the desired location (prevent recession via the adhesive properties of the adhesion layer) and protect the material of the peg (e.g., rhodium) from oxidation during further processing. In some embodiments, the adhesion layer could entirely wrap one or more portions of the NFT or peg portion of the NFT. In some embodiments, the adhesion layer could wrap less than the entire NFT or peg portion.

Possible materials for an adhesion layer can be chosen based at least in part on the ability of the material to maintain a bond with the peg material, the ability of the material to maintain a bond with the adjacent material, or combinations thereof. Typically, the NFT or more specifically the peg, is surrounded by an oxide, therefore in order to determine the ability of a potential material to maintain a bond with the adjacent material, the bond strength of an element (for example) with oxygen (O) can be utilized. Table 3 below shows the bond strength to Rhodium (Rh) as an example, the bond strength to oxygen (O), the oxidation free energy and a figure of merit (FOM) based on these three considerations for various elements. It should be noted that illustrative materials for adhesion layers for use in pegs that are made of materials other than Rh could be chosen, based at least in part, on similar considerations by considering the bond strength of the potential elements to the peg material (instead of the bond strength to Rh as seen in Table 3). Generally, an element with a bond strength to Rh that is at least the same as Rh to Rh, a bond strength to O that is at least the same as the bond strength of Rh to O, or some combination thereof may be useful. Higher FOMs indicate that the element may be advantageous.

TABLE 3

| Element | Bond Strength to Rh (kJ/mol at 298°) | Oxidation Free Energy (kJ/mol) | Bond Strength to O (kJ/mol at 298°) | FOM |
|---------|--------------------------------------|-------------------------------|-------------------------------------|-----|
| Au | 232 |       | 223  | −1 |
| B  | 475 | −750  | 809  | 4  |
| Ba | 259 | −1050 | 562  | 1  |
| C  | 580 | −400  | 1076 | 6  |
| Ce | 545 |       | 790  | 5  |
| Eu | 238 |       | 473  | 0  |
| H  | 241 | −350  | 430  | 0  |
| La | 550 |       | 798  | 5  |
| O  | 405 |       | 498  | 2  |
| P  | 353 |       | 589  | 2  |
| Rh | 235 | −500  | 405  | 0  |
| Sc | 444 | −1100 | 671  | 3  |
| Si | 395 | −800  | 800  | 4  |
| Th | 513 |       | 877  | 5  |
| Ti | 390 | −900  | 666  | 4  |
| U  | 519 |       | 755  | 4  |
| V  | 364 | −800  | 637  | 3  |
| Y  | 446 | −1100 | 714  | 4  |

Based at least in part on the above considerations, useful materials for adhesion layers may include boron (B), carbon (C), cerium (Ce), lanthanum (La), phosphorus (P), scandium (Sc), silicon (Si), thorium (Th), titanium (Ti), uranium (U), vanadium (V), yttrium (Y), or combinations thereof. In some embodiments, adhesion layers can include yttrium (Y), carbon (C), or combinations thereof.

Disclosed adhesion layers can be located on one or more surfaces of the peg, the disc, or both. In some embodiments, an optional adhesion layer can be located on at least one surface of the peg. In some embodiments, an adhesion layer or layers can be located on at least one or more surfaces of the peg that are adjacent an oxide or oxide containing structure. An example of an oxide containing structure that may be next to the peg includes cladding layers. As such, in some embodiments, an adhesion layer or layers can be located on at least one or more surfaces of the peg that are adjacent one or more cladding layers or structures.

FIG. 18A shows an illustrative embodiment depicting a possible location for an optional adhesion layer. FIG. 18A includes a disc 10, which does not necessarily have to be oval in shape, a peg 12 and an adhesion layer 15. It should also be noted that FIG. 18A illustrates the delineation between the rod 11 and the peg, the portion of the rod 11 which is in front of or not within the disc 10 (this construct applies to all embodiments depicted herein, whether stated or not). Stated another way, the rod 11 includes the peg 12, but the peg 12 does not include the entire rod 11, except in cases where the peg is abutted to the rod and then the peg also includes the entire rod. The embodiment of the device in FIG. 18A includes an adhesion layer 15 that is located around, adjacent to, or on the entire rod 11. Although not depicted in FIG. 18A, because it is a plan view, the adhesion layer 15 can also be located underneath and on top of the rod 11. Stated another way, the adhesion layer 15 in such an embodiment can cover all surfaces of the rod 11, except the air bearing surface (ABS) 9. Such an embodiment can be formed by depositing the material of the adhesion layer before the rod material is deposited (e.g., as a seed layer for example), depositing and forming the rod and then depositing the material of the adhesion layer on the surfaces of the rod 11 as seen in FIG. 18A as well as on the top surface of the rod, before any additional cladding material is deposited around or on the rod. Such all-around adhesion layers may help adhere the peg to the adjacent dielectrics and can prevent or at least minimize diffusion of the peg material into the disc or disc material into the peg.

FIG. 18B illustrates another example of a device including an optional adhesion layer. FIG. 18B includes a disc 10, which does not necessarily have to be oval in shape, a peg 12 and an adhesion layer 16. The adhesion layer 16 in this embodiment is located around, adjacent to, or on the peg 12, but no portion of the remainder of the rod. Although not depicted in FIG. 18B, because it is a plan view, the adhesion layer 16 can also be located underneath and on top of the peg 12. Stated another way, the adhesion layer 16 in such an embodiment can cover all surfaces of the peg 12, except the air bearing surface (ABS). Such an embodiment can be formed by depositing the material of the adhesion layer before the peg material is deposited (e.g., as a seed layer for example), forming the peg and then depositing the material of the adhesion layer after formation of the peg (and in some embodiments part of the disc, e.g., the bottom disc) as well as on the top surface of the peg, before any additional cladding material is deposited around or on the peg. Such configurations may promote adhesion between the peg and the dielectric without disrupting the thermal pathway between the rod and disc.

FIG. 18C illustrates another example of a device including an optional adhesion layer. FIG. 18C includes a disc 10, which does not necessarily have to be oval in shape, a peg 12 and an adhesion layer 17. The adhesion layer 17 in this embodiment is only located at the air bearing surface (ABS) of the peg, which can also be called the front of the peg 12. This type of an adhesion layer can also be referred to as an ABS cap. This adhesion layer could then optionally be further covered or have deposited thereon an overcoat layer. This configuration may have the advantage of promoting adhesion of the peg to the air bearing surface.

FIG. 18D illustrates another example of a device including an optional adhesion layer. FIG. 18D includes a disc 19, which although not visible in FIG. 18D is a two layer disc including a bottom disc and a top disc. This is shown in FIG. 18E, which shows the disc 19 made up of a bottom disc 20 and a top disc 21, delineated by the dashed line. The bottom disc 20 has a larger footprint than does the top disc 21 and the top disc 21 is located entirely within the footprint of the bottom disc 20. The adhesion layer 18 in this illustrated embodiment is located on the exposed outer surface of the bottom disc 20, where the top disc 21 is not covering the bottom disc 20. The adhesion layer 18 is illustrated in this embodiment as also covering the sides of the top disc 21. It should be noted that this portion of the adhesion layer 18 is not necessary and need not be present. Although not depicted in this embodiment, the adhesion layer may also be located underneath the bottom disc 20, e.g., adjacent the bottom surface 22 of the bottom disc 20 (as seen in FIG. 18E). It should also be noted that the illustrated adhesion layer 18 is located adjacent the side surfaces of the peg 12. Such an adhesion layer can be formed by first depositing the material of the adhesion layer (if it is desired to have the adhesion layer adjacent the bottom surface 22 of the bottom disc 20), then depositing and forming the bottom disc, depositing the top disc and then depositing the material of the adhesion layer 18. Adhesion layers such as these may be able to prevent or at least minimize diffusion associated with disc materials that aren't completely dense. In some alternative embodiments, an adhesion layer may alternatively or optionally be located between the bottom disc 20 and the top disc 19. An adhesion layer located between the two discs may serve to limit the volume of under-dense material thereby limiting the size of the holes that may appear upon densification.

Portions of the adhesion layer that may be functioning as a seed layer as well, e.g., will have materials deposited thereof may, but need not be made of materials different than the remaining adhesion layer materials. It should also be noted that any combinations of the above discussed adhesion layer configurations or portions thereof can also be utilized and are considered to have been disclosed herein.

It should also be noted that other structures can be combined with the devices, configurations, structures, or combinations thereof disclosed herein. For example, gas barrier layers, overcoat layers, seed layers, or combinations thereof can be combined with various devices or structures illustrated herein.

The present disclosure is illustrated by the following example. It is to be understood that the particular example, assumptions, modeling, and procedures are to be interpreted broadly in accordance with the scope and spirit of the disclosure as set forth herein.

EXAMPLE 45 nanometer rhodium (Rh) films were deposited on the alumina surface of a three layer structure: Si/SiOx/AlOx. The Rh film was either deposited directly on the three layer structure, with 5 Angstroms (Å) carbon (C) deposited before the Rh, or with 5 Å yttrium (Y) deposited before the Rh. The structures so formed were either tested as deposited, after annealing at 225° C., or after annealing at 400° C. Twenty five (25) tape tests (application of a piece of transparent adhesive tape on the structure and subsequent removal thereof) were carried out on each structure. The film stress (Mpa) was also measured on each structure by measuring the curvature (bowing) change in the substrate due to the addition of the metal film. Table 4 below shows the results. The results of the tape tests are reported as positive (adding to the count) if the Rh layer stayed on the structure but was not removed when the tape was removed.

TABLE 4

| Sample | As deposited | Annealed at 225° C. | Annealed at 400° C. | Film Stress (Mpa) |
|---|---|---|---|---|
| Rh only | 0/25 | 0/25 | 0/25 | −738.5 |
| Rh on 5 Å Carbon | 25/25 | 25/25 | 0/25 | −510.1 |
| Rh on 5 Å Yttrium | 25/25 | 25/25 | 25/25 | −570.7 |

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of devices including a near field transducer (NFT) including peg and disc from different materials are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A device having an air bearing surface (ABS), the device comprising:
    a near field transducer (NFT) comprising:
        a disc configured to convert photons incident thereon into plasmons; and
        a peg configured to couple plasmons coupled from the disc into an adjacent magnetic storage medium,
        wherein the peg extends beyond the disc, and the peg comprises rhodium (Rh), aluminum (Al), iridium (Ir), silver (Ag), copper (Cu), palladium (Pd), platinum (Pt), alloys thereof, or combinations thereof and
        wherein the disc comprises a disc material comprising gold or a gold alloy and the peg comprises a peg material, wherein the disc material is different from the peg material.

2. The device according to claim 1, wherein the peg comprises rhodium (Rh), iridium (Ir), or combinations thereof.

3. The device according to claim 1, wherein the peg comprises rhodium (Rh).

4. A device having an air bearing surface (ABS), the device comprising:
    a near field transducer (NFT) comprising:
        a disc configured to convert photons incident thereon into plasmons; and
        a peg configured to couple plasmons coupled from the disc into an adjacent magnetic storage medium,
        wherein the peg extends beyond the disc, and the peg comprises rhodium (Rh), aluminum (Al), iridium (Ir), silver (Ag), copper (Cu), palladium (Pd), platinum (Pt), alloys thereof, or combinations thereof, and
        wherein the disc comprises gold or a gold alloy and the peg comprises a peg material, wherein the disc material is different from the peg material and wherein the peg material comprises rhodium (Rh), aluminum (Al), iridium (Ir), silver (Ag), copper (Cu), palladium (Pd), platinum (Pt), alloys thereof, or combinations thereof and aluminum (Al), antimony (Sb), bismuth (Bi), chromium (Cr), cobalt (Co), copper (Cu), erbium (Er), gadolinium (Gd), gallium (Ga), hafnium (Hf), indium (In), iridium (Ir), iron (Fe), manganese (Mn), molybdenum (Mo), nickel (Ni), niobium (Nb), osmium (Os), palladium (Pd), platinum (Pt), rhenium (Re), rhodium (Rh), ruthenium (Ru), scandium (Sc), silicon (Si), silver (Ag), tantalum (Ta), tin (Sn), titanium (Ti), vanadium (V), tungsten (W), ytterbium (Yb), yttrium (Y), zirconium (Zr), or combinations thereof.

5. The device according to claim 4, wherein the peg comprises rhodium (Rh) or iridium (Ir).

6. The device according to claim 4, wherein the peg comprises rhodium (Rh).

7. A device having an air bearing surface (ABS), the device comprising:
    a near field transducer (NFT) comprising:
        a disc configured to convert photons incident thereon into plasmons;

a peg configured to couple plasmons coupled from the disc into an adjacent magnetic storage medium, the peg having a front surface at the air bearing surface of the device, an opposing back surface, a top surface that extends from the front surface to the back surface, two side surfaces that extend from the front surface to the back surface and a bottom surface that extends from the front surface to the back surface;

an adhesion layer located on at least one surface of the peg, wherein the peg extends beyond the disc, and the peg comprises rhodium (Rh), aluminum (Al), iridium (Ir), silver (Ag), copper (Cu), palladium (Pd), platinum (Pt), alloys thereof, or combinations thereof, and wherein the disc comprises gold or an alloy thereof and the peg comprises a peg material, wherein the disc material is different from the peg material and wherein the peg material is selected from: aluminum (Al), antimony (Sb), bismuth (Bi), chromium (Cr), cobalt (Co), copper (Cu), erbium (Er), gadolinium (Gd), gallium (Ga), hafnium (Hf), indium (In), iridium (Ir), iron (Fe), manganese (Mn), molybdenum (Mo), nickel (Ni), niobium (Nb), osmium (Os), palladium (Pd), platinum (Pt), rhenium (Re), rhodium (Rh), ruthenium (Ru), scandium (Sc), silicon (Si), silver (Ag), tantalum (Ta), tin (Sn), titanium (Ti), vanadium (V), tungsten (W), ytterbium (Yb), yttrium (Y), zirconium (Zr), or combinations thereof.

8. The device according to claim 7, wherein the peg comprises rhodium (Rh) or iridium (Ir).

9. The device according to claim 7, wherein the peg comprises rhodium (Rh).

* * * * *